(12) United States Patent
Vogel et al.

(10) Patent No.: US 12,345,559 B2
(45) Date of Patent: Jul. 1, 2025

(54) FILL-LEVEL MEASUREMENT DEVICE

(71) Applicant: Endress+Hauser SE+Co. KG, Maulburg (DE)

(72) Inventors: Markus Vogel, Schopfheim (DE); Harald Faber, Lörrach (DE); Anton Kochetkov, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 308 days.

(21) Appl. No.: 18/252,122

(22) PCT Filed: Sep. 23, 2021

(86) PCT No.: PCT/EP2021/076264
§ 371 (c)(1),
(2) Date: May 8, 2023

(87) PCT Pub. No.: WO2022/100915
PCT Pub. Date: May 19, 2022

(65) Prior Publication Data
US 2023/0400342 A1      Dec. 14, 2023

(30) Foreign Application Priority Data
Nov. 11, 2020   (DE) .................... 10 2020 129 764.5

(51) Int. Cl.
G01F 23/284 (2006.01)

(52) U.S. Cl.
CPC .................. G01F 23/284 (2013.01)

(58) Field of Classification Search
CPC .................................................... G01F 23/284
USPC ........................................................ 342/124
See application file for complete search history.

(56) References Cited

U.S. PATENT DOCUMENTS

| | | | | |
|---|---|---|---|---|
| 4,539,565 A * | 9/1985 | Norsworthy | ......... | G06V 10/255 342/128 |
| 5,726,607 A * | 3/1998 | Brede | ...................... | H03L 7/07 331/25 |
| 6,014,100 A * | 1/2000 | Fehrenbach | ............ | G01S 13/88 342/124 |
| 6,754,613 B2 * | 6/2004 | Tabatabaei | .............. | G04F 10/06 702/189 |
| 7,898,344 B2 * | 3/2011 | Hongo | .................. | G01S 7/0235 342/464 |

(Continued)

FOREIGN PATENT DOCUMENTS

| | | | | |
|---|---|---|---|---|
| DE | 102006058852 A2 | 6/2008 | | |
| EP | 2690455 B1 * | 2/2017 | ........... | G01S 13/343 |

(Continued)

*Primary Examiner* — Nuzhat Pervin
(74) *Attorney, Agent, or Firm* — Mark A. Logan; Endress+Hauser (USA) Holding, Inc.

(57) ABSTRACT

In an FMCW-based fill-level measurement device, the fill-level value can be compensated with regard to component tolerances. A diagnosis unit of the fill-level measurement device compares the clock rate of the signal-generating PLL with the sampling rate of the analog/digital converter and determines a first compensation factor. With the aid of the first compensation factor, the determined fill-level value can be compensated with regard to these sampling or clock rates without any external high-precision reference source having to be used for this purpose.

11 Claims, 2 Drawing Sheets

(56) References Cited

U.S. PATENT DOCUMENTS

| | | | |
|---|---|---|---|
| 7,982,661 B2 * | 7/2011 | Beasley | G01S 7/4056 |
| | | | 342/194 |
| 10,623,006 B2 * | 4/2020 | Nelson | H03K 5/082 |
| 10,656,002 B2 * | 5/2020 | Fehrenbach | G01F 23/284 |
| 10,749,535 B2 * | 8/2020 | Nelson | H03K 5/082 |
| 10,848,161 B2 * | 11/2020 | Nelson | H03K 5/133 |
| 11,015,969 B2 * | 5/2021 | Welle | G01F 23/284 |
| 11,038,511 B2 * | 6/2021 | Weeks | H03L 7/0805 |
| 2003/0076181 A1 * | 4/2003 | Tabatabaei | G04F 10/06 |
| | | | 331/57 |
| 2003/0098731 A1 * | 5/2003 | Tabatabaei | G04F 10/06 |
| | | | 327/160 |
| 2006/0201246 A1 * | 9/2006 | Rolfes | G01B 15/04 |
| | | | 73/290 V |
| 2011/0182386 A1 * | 7/2011 | Duello | H04L 27/16 |
| | | | 375/344 |
| 2013/0213132 A1 * | 8/2013 | Wegemann | G01F 23/284 |
| | | | 73/290 V |
| 2017/0254692 A1 * | 9/2017 | Faber | H01P 3/06 |
| 2018/0102895 A1 * | 4/2018 | Schell | H04L 7/0012 |
| 2018/0106602 A1 * | 4/2018 | Welle | H01Q 21/205 |
| 2018/0328772 A1 * | 11/2018 | Schultheiss | G01S 7/036 |
| 2018/0372530 A1 * | 12/2018 | Welle | G01F 23/284 |
| 2018/0372531 A1 * | 12/2018 | Waelde | H01Q 21/064 |
| 2019/0004563 A1 * | 1/2019 | Nelson | G06F 1/04 |
| 2019/0004565 A1 * | 1/2019 | Nelson | G06F 1/12 |
| 2019/0007052 A1 * | 1/2019 | Nelson | H03L 7/1075 |
| 2019/0007055 A1 * | 1/2019 | Nelson | G06F 1/10 |
| 2019/0107427 A1 * | 4/2019 | Waelde | G01S 13/88 |
| 2019/0107429 A1 * | 4/2019 | Waelde | G01S 13/88 |
| 2020/0076439 A1 * | 3/2020 | Weeks | H03L 7/0805 |
| 2021/0036706 A1 * | 2/2021 | Weeks | H03L 7/0807 |

FOREIGN PATENT DOCUMENTS

| | | | | |
|---|---|---|---|---|
| EP | 3343243 A1 * | 7/2018 | | G01R 31/2832 |
| KR | 20140059084 A | 5/2014 | | |
| WO | 9838525 A1 | 9/1998 | | |

* cited by examiner

FILL-LEVEL MEASUREMENT DEVICE

CROSS-REFERENCE TO RELATED APPLICATIONS

The present application is related to and claims the priority benefit of DPMA Patent Application No. 10 2020 129 764.5, filed on Nov. 11, 2020, and International Patent Application No. PCT/EP2021/076264, filed Sep. 23, 2021, the entire contents of which are incorporated herein by reference.

TECHNICAL FIELD

The invention relates to a fill-level measurement device which can be compensated in terms of its clocking.

In automation technology, in particular for process automation, a plurality of different measured variables must be determined depending on the process. Depending on the application the measured variable may, for example, be a fill level, a flow, a pressure, the temperature, the pH value, the redox potential, a conductivity, or the dielectric constant of a medium in a process plant. For the acquisition of the corresponding measured values, field devices designed for this purpose are used, which are based on suitable sensors or on suitable measuring principles. A variety of different types of field devices are manufactured and marketed by the Endress+Hauser group of companies.

Radar-based measuring methods have become established for measuring fill levels in containers. In the context of this patent application, the terms "radar" and "high-frequency" refer to corresponding signals with frequencies between 0.03 GHz and 300 GHz. Typical frequency bands at which fill-level measurement is performed are at 2 GHz, 26 GHz, 79 GHz, or 120 GHz. In addition to robustness and ease of maintenance, radar-based fill-level measurement as compared to other measuring methods offers the advantage of being able to measure the fill level almost continuously.

In the case of radar, the FMCW (frequency-modulated continuous wave) principle is the most common measuring principle for measuring distance or fill level. In principle, this measuring principle is based on transmitting a high-frequency signal continuously and with modulated frequency. Here, the frequency of the high-frequency signal to be transmitted lies within the defined frequency band in the range of a standardized center frequency. The change in frequency over time is linear by default for FMCW, and has a ramped or triangular shape. However, a sinusoidal change can in principle also be used. The high-frequency signal within a signal-generation unit of the fill-level measurement device is generally generated by a PLL ("phase-locked loop," in German also known as a phase control loop). Here, the PLL generates the sawtooth-shaped high-frequency signal with reference to a constant, internal clock frequency $clk_1$ such as, for example, a quartz oscillator.

In the implementation of the FMCW method, the distance d from the filling material or the fill level is determined on the basis of the instantaneous frequency difference $f_{IF}$ between the currently received high-frequency signal and the currently emitted high-frequency signal in that a base signal is generated by mixing the corresponding electrical high-frequency signals. In this case, the distance d can be determined with the aid of the frequency $f_{IF}$ of the base signal, since the frequency $f_{IF}$ of the base signal changes proportionally to the distance d. Here, c is the speed of light, k represents the ramp steepness of the frequency change. The frequency $f_{IF}$ of the base signal can be determined, for example, by digitizing the base signal with a defined sampling rate $clk_2$ and then subjecting it to a fast Fourier transform. The FMCW-based measuring principle for level measurement is described in greater detail in, for example, "*Radar Level Detection*, Peter Devine, 2000."

On the basis of the FMCW method, fill-level measurement devices can ideally achieve a high fill-level resolution with a comparatively low outlay in terms of circuitry, in order thus to achieve a required resolution in the sub-millimeter range depending on the field of application. However, the resolution is often limited in practice by various component tolerances. In the case of FMCW, it is in particular component tolerances with regard to internal clock frequencies that lead to a corresponding measurement error in the fill-level measurement. However, it is again difficult to realize within a measurement device a compensation of the measurement errors generated by the deviation of the clock frequencies from the target frequencies. This is because, in terms of circuitry, a direct frequency measurement is not possible, but only indirectly by measuring the ratio of the actual frequency in relation to a known reference frequency. However, the integration of a reference source, the reference frequency of which has virtually no component-related tolerances, cannot be implemented economically.

The invention is therefore based on the object of providing a fill-level measurement device, the tolerances of which can be compensated in terms of internal clocking in order to minimize measurement errors.

The invention solves this problem with an FMCW-based fill-level measurement device for measuring a compensated fill-level value of a filling material in a container, wherein the fill-level measurement device comprises the following components:

an antenna arrangement, by means of which a high-frequency signal can be transmitted towards the filling material and after reflection at the filling material surface can be received as a received signal, a signal generation unit, which is designed, for example, as a PLL in order to generate the high-frequency signal according to the FMCW principle with reference to a defined clock rate, a receiving unit, which is designed
  to mix the reception signal in accordance with the FMCW principle into a low-frequency base signal, and
  to sample the base signal at a defined sampling rate, an evaluation unit, which is designed
  to determine a distance value for the filling material with the aid of the sampled base signal, for example by means of a Fourier transform,
  to compensate the distance value by means of a first compensation factor and/or a second compensation factor, and
  to determine the compensated fill-level value with the aid of the compensated distance value, and a diagnosis unit, which is designed
  to determine the first compensation factor by comparing the clock rate with the sampling rate, and/or
  to determine the second compensation factor by comparing the dock rate and/or the sampling rate with a reference frequency and/or the first compensation factor, and
  to transmit after determination the first compensation factor or the second compensation factor to the evaluation unit.

In this case, the fill-level measurement device can comprise a suitable (production) interface for any transmission of the first compensation factor, the second compensation factor, the clock rate, the sampling rate and/or a reference frequency.

Within the scope of the invention, the term "unit" in principle refers to any electronic circuit that is designed in a manner suitable for the intended purpose. Depending on the requirement, it may therefore be an analog circuit for generating or processing corresponding analog signals. However, it may also be a digital circuit, such as an FPGA, or a storage medium in interaction with a program. In this case, the program is designed to perform the corresponding method steps or to apply the necessary calculation operations of the respective unit. In this context, various electronic units of the measurement device in the sense of the invention can potentially also access a common physical memory or be operated physically by means of the same digital circuit.

Analogously to the fill-level measurement device according to the invention, the object of the invention is also achieved by a corresponding measurement method for determining the fill level. In this case, the method comprises the following method steps:
- determining the first compensation factor by comparing the clock rate with the sampling rate, and/or
- determining the second compensation factor by comparing the clock rate and/or the sampling rate with the reference frequency.

The invention therefore makes use of the fact that, as regards potential internal clock deviations, in case of doubt the fill-level measurement device can also be compensated at least to a certain extent by comparing the clock rate with the sampling rate. In this case, within the context of the invention the clock rate ($clk_1$) and the sampling rate ($clk_2$) can, for example, be compared with one another, in that according to $$R_{2,1} = \frac{clk_2}{clk_1}$$

a ratio ($R_{2,1}$) of the rates ($clk_1$, $clk_2$) to each other is determined. In this case, the first compensation factor $k_1$ can be calculated according to $$k_1 = R_{2,1} * \frac{clk_{1,soll}}{clk_{2,soll}}$$

where $clk_{1,2soll}$ is the respective target values of the clock rate or sampling rate.

The clock rate ($clk_1$) and the sampling rate ($clk_2$) can in each case also be compared with an external reference frequency ($clk_{ref}$) in that according to $$R_{1,ref} = \frac{clk_1}{clk_{ref}}; R_{2,ref} = \frac{clk_2}{clk_{ref}}$$

ratios ($R_{1,ref}$, $R_{2,ref}$) of the rates ($clk_1$, $clk_2$) in relation to the reference frequency ($clk_{ref}$) are determined. In this case, the second compensation factor ($k_2$) can be calculated according to $$k_2 = \left(\frac{clk_{1,soll}}{R_{1,ref} * clk_{ref}}\right)^2 \cdot \frac{R_{2,ref} * clk_{ref}}{clk_{2,soll}}.$$

An advantage of the method according to the invention is that the first compensation factor can be continuously updated. This means that the analysis unit in this design variant repeatedly determines the first compensation factor during or between continuous fill-level measurements. With such a design of the fill-level measurement device, it can be classified as operative as long as the first compensation factor over the continuous fill-level measurements does not exceed an initially defined minimum change value. In the other case, a warning signal could, for example, be generated in order to signal inoperability, for example, to a process control center. It is also advantageous for a continuous re-determination of the first compensation factor that the determined fill-level value, in the case of a corresponding design of the fill-level measurement device according to the EN ISO 9001:2015 DIN over the continuous fill-level measurements, is traceable.

In particular, if no reference source is implemented in the fill-level measurement device for generating a highly precise reference frequency, the possible second compensation factor can be determined during production of the fill-level measurement device on the basis of an external reference frequency, for example by comparing the clock rate and/or the sampling rate in each case with the reference frequency of the external reference source. In this case, the second compensation factor can either be calculated by an external unit, wherein the second compensation factor is to be transmitted in this case to the evaluation unit via the production interface. Otherwise, the reference frequency can be transmitted to the analysis unit via the production interface, so that the second compensation factor is calculated in this case within the fill-level measurement device by the analysis unit.

BRIEF DESCRIPTION OF THE DRAWINGS

The invention is explained in more detail with reference to the following figures. In the figures.

DETAILED DESCRIPTION

Figure 1:
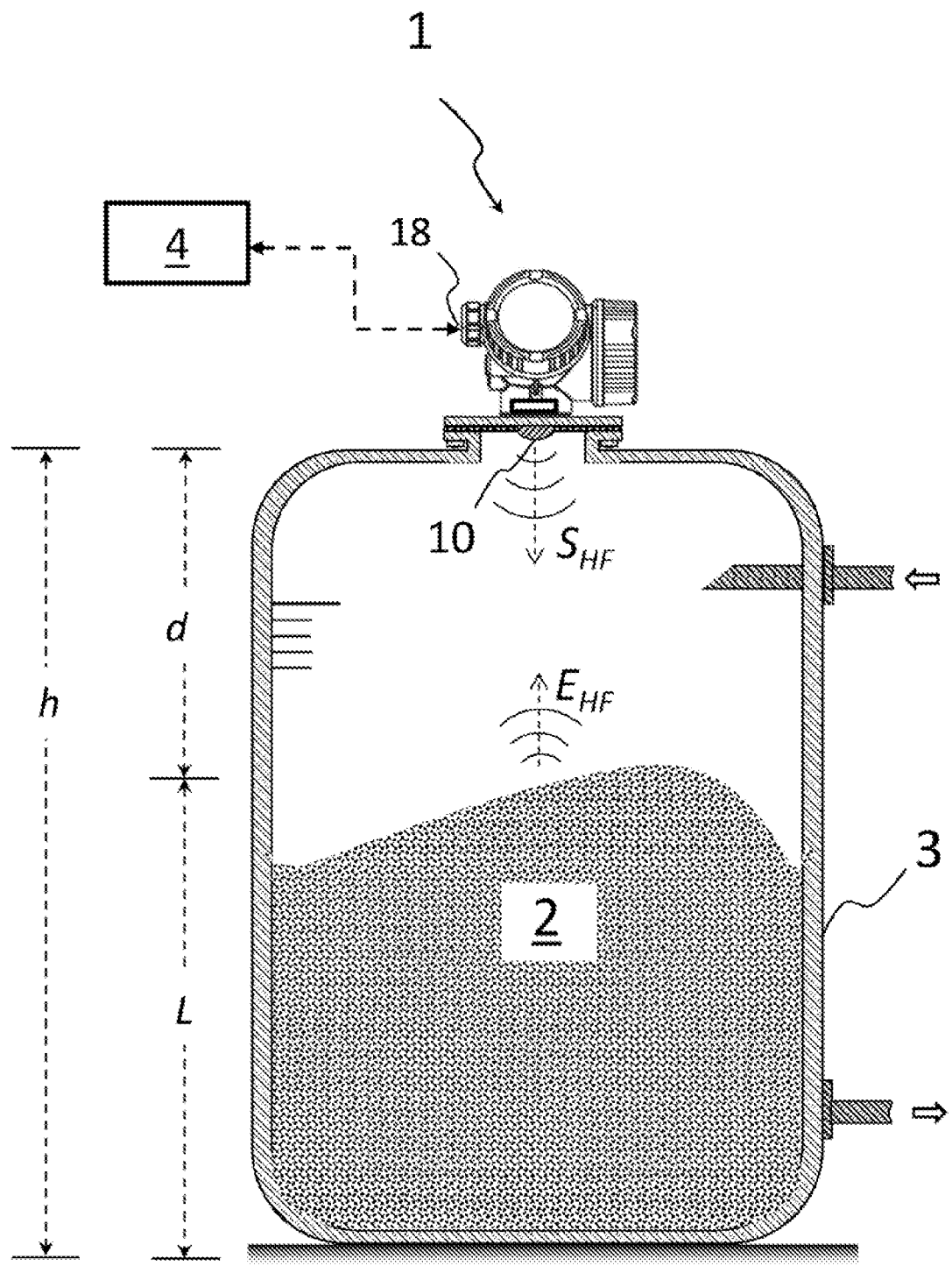
FIG. 1 shows an FMCW-based fill-level measurement device on a container.

For the basic understanding of radar-based fill-level measurement, FIG. 1 shows a container 3 with a filling material 2, the fill level L of which is to be determined. The container 3 can be up to more than 100 m high, depending on the type of filling material 2 and field of application. In order to be able to determine the fill level L, a fill-level measurement device 1 is attached to a corresponding opening on the container 3 at a known installation height h above the filling material 2. As a rule, the fill-level measuring device 1 is connected via an interface, such as "PROFIBUS," "HART" or "Wireless HART," to a higher-level unit 4, such as a process control system. The fill-level value L can be transmitted via this, for example in order to control if necessary any inflows or outflows of the container 3. However, other information about the general operating state of the fill-level measuring device 1 can also be communicated.

The fill-level measurement device 1 is oriented and fastened to the container 3 in such a way that via an antenna arrangement 10 it emits high-frequency signals $S_{HF}$ approximately along a horizontally aligned axis in the direction of the surface of the filling material 2. In this case, the high-frequency signal $S_{HF}$, in accordance with the FMCW principle, has a frequency change that is constant over time within a defined frequency band of, for example, 79 GHz to 81 GHz, so that a saw-toothed or triangular frequency curve over time results within the frequency band.

After reflection at the filling material surface, the fill-level measurement device 1 receives the reflected radar signals $E_{HF}$ again via the antenna arrangement 10. Here, due to the frequency change owing to the FMCW principle, the frequency difference $f_{IF}$ between the currently emitted high-frequency signal s HF and the instantaneous reception signal $E_{HF}$ is proportional to the distance d between the fill-level measurement device 1 and the filling material 2. Accordingly, the fill-level measurement device 1 can, for example, on the basis of a corresponding calibration, assign the measured frequency difference $f_{IF}$ to the respective distance d. In this way, the fill-level measurement device 1 can according to $$d = h - L$$

determine the fill level L provided the installation height h is stored in the fill-level measurement device 1.

Figure 2:
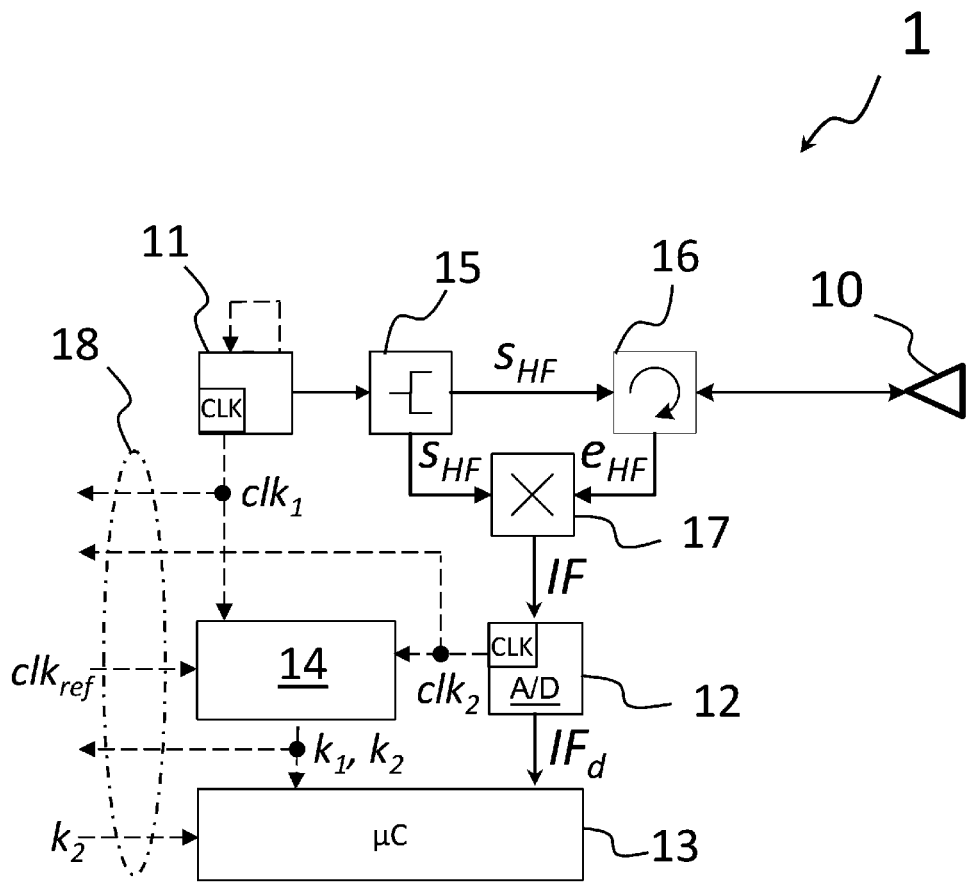
FIG. 2 shows a block diagram of a fill-level measurement device according to the present disclosure.

A circuit by means of which the fill-level measurement device 1 can implement the FMCW principle for fill-level measurement is shown in FIG. 2 in more detail as a block diagram: To generate the high-frequency signal $S_{HF}$, the fill-level measurement device 1 comprises a signal generation unit 11 which in accordance with the FMCW principle is designed to generate in the corresponding frequency band the high-frequency signal ($s_{HF}$) with a ramp-shaped or triangular frequency change. The high-frequency signal $s_{HF}$ is generated in such a way that the ramp-shaped, i.e. constant frequency change, is repeated periodically within the frequency band. By default, the frequency ramp repeats with a periodicity of a few 100 ms. The duration of the individual frequency ramp is between 100 μs and 100 ms. The position of the frequency band must be set taking into account regulatory requirements, for which reason the ISM bands at 6 GHz, 26 GHz, 79 GHz or 120 GHz are preferably implemented as frequency band. The bandwidth lies in particular between 0.5 GHz and 10 GHz, depending on the position of the frequency band. Higher frequency bands are generally preferred, since these allow a higher absolute bandwidth. This in turn increases the potential accuracy of measurement.

Figure 3:
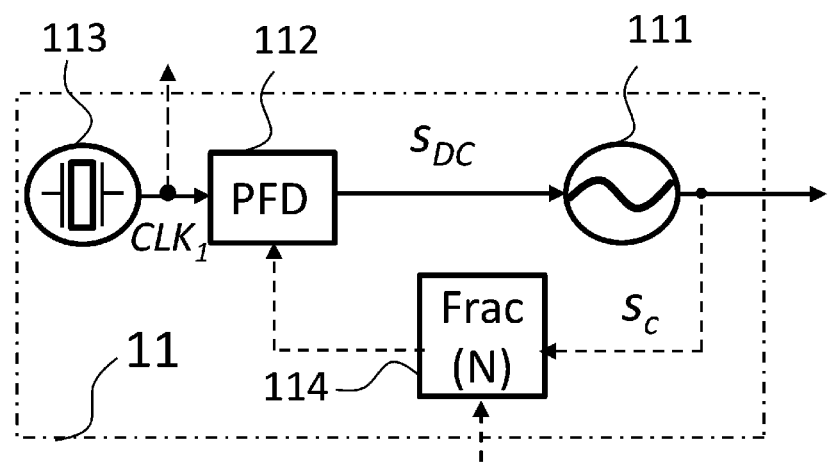
FIG. 3 shows a phase-locked loop for generating the high-frequency signal.

According to the prior art, the signal generation unit 11 is standardly implemented as a PLL ("phase-locked loop, PLL," also known in German as a phase control loop), as shown in FIG. 3. The core of the circuit there is a controllable, electrical high-frequency oscillator 111 (standardly realized as a "voltage-controlled oscillator"), which generates the electrical high-frequency signal $s_{HF}$. The frequency of the VCO or of the high-frequency signal $s_{HF}$ is regulated by feedback in the signal generation unit 11 shown and on the one hand is thus stabilized against fluctuations in the ambient temperature; on the other hand, the constant frequency change of the high-frequency signal $s_{HF}$ is set by this means: The feedback is realized in that a control signal $s_c$ branches off from the high-frequency signal $s_{HF}$ of the high-frequency oscillator 111 and is fed to a phase comparator 112. The phase comparator 112 compares the current phase shift of the control signal $s_c$ with a clock rate $clk_1$ of constant frequency. As source for the clock rate $clk_1$ a quartz oscillator 113 can be used, for example, which has a clock rate $clk_1$ typically between 10 MHz and 100 MHz. Depending on the phase difference between the control signal $s_c$ and the quartz oscillator 113, the phase comparator 112 generates a control signal six, which is routed to a corresponding control input of the high-frequency oscillator 111. If the high-frequency oscillator 111 takes the form of a VCO and accordingly requires a DC voltage to control the frequency of the high-frequency signal $s_{HF}$, a charge pump can be connected downstream of the digital phase comparator 112, said charge pump performing a corresponding digital/analog conversion of the control signal Soc.

In the variant of the high-frequency generation unit 11 described in FIG. 3 the ramp-shaped frequency change, which is usual in FMCW radar, of the high-frequency signal $s_{HF}$ is set at a frequency divider 114, which is arranged in the signal path between the high-frequency oscillator 111 and the phase comparator 112: This frequency divider 114, known as the "fractional-N divider," is according to the prior art controlled in such a way that its divider factor N changes constantly over time, that is to say quasi-ramp-shaped. The smallest resolvable frequency resolution in fractional-N dividers depends on the word width N; it is 20-32 bits.

Due to the operating principle of the PLL shown in FIG. 3 is the frequency ramp of the resulting high-frequency signal $S_{HF}$ is thus generated in reference to the clock frequency $clk_1$ of the quartz oscillator 113.

As shown in FIG. 2, the signal generation unit 11 feeds the high-frequency signal $S_{HF}$ to the antenna arrangement 10 via a signal divider 15 and a downstream transmit/receive switch 16. In this case, the design of the transmit/receive switch 16 is in principle not prespecified; it can be implemented, for example, as a duplexer. The design of the antenna arrangement 10 is to be selected primarily on the basis of the frequency band. In the case of frequencies in the GHz range that has been set, a horn antenna can for example be used as an antenna arrangement as schematically indicated in FIG. 2. In particular in the higher two-digit GHz range, a more compact planar antenna, such as a patch antenna or a fractal antenna, can also be used.

The received radar signal $E_{HF}$, which is reflected at the filling material surface, is converted back by the antenna arrangement 10 into a purely electrical received signal e HF and optionally amplified by a receive amplifier (not shown in FIG. 2). The received signal e HF is then mixed by a receiving mixer 17 with the high-frequency signal $s_{HF}$ that is to be transmitted, wherein the high-frequency signal $s_{HF}$ is for this purpose branched off from a signal splitter 15. This generates a base signal IF typical of the FMCW method, by means of which the distance d or the fill level L can be determined. In this case, the FMCW principle is used, according to which the resulting frequency $f_{IF}$ of the base signal IF according to $$d = \frac{c \cdot f_{IF}}{2 \cdot k \cdot clk_1^2}$$

is proportional to the distance d.

To determine the frequency $f_{IF}$ of the base signal IF, an analog/digital converter 12 digitizes the base signal IF. In order to comply with the scanning theorem, the analog/digital converter 12 preferably samples the base signal IF at a sampling frequency $clk_2$ ab, which corresponds to at least twice the frequency $f_{IF}$ of the base signal IF corresponding to the distance d. A correspondingly designed evaluation unit 13 can thus subject the digitized evaluation signal to a (fast) Fourier transform, or FFT for short. In the ideal case the frequency of the global maximum of the corresponding FFT spectrum here corresponds to the distance d.

As can be seen from the previous formula, it is necessary for the correct determination of the distance d that the clock rate $clk_1$ of the signal generation unit 11 corresponds exactly to its target value $clk_{1,soll}$. In addition, a deviation of the sampling rate $clk_2$ from its target value $clk_{2,soll}$ also leads to a corresponding error when determining the distance value d' determined by the evaluation unit 13. A device-internal adjustment of the clock rate $clk_1$ or sampling rate $clk_2$ to the respective target value $clk_{1,2soll}$ is not however feasible from a commercial point of view, since a direct frequency measurement is not possible with a metrologically justifiable effort. It is rather the case that in terms of hardware technology there is only the possibility of determining individual frequencies as ratios $V_{1,2}$ $V_{1,ref}$ in relation to fixed reference frequencies $clk_{ref}$. In this case, it is again not possible with a technically justifiable effort to integrate a separate reference source with the desired accuracy in the fill-level measurement device 1.

According to the invention, the fill-level measurement device 1 shown in FIG. 2 therefore comprises a diagnosis unit 14, by means of which the clock rate $clk_1$ of the signal generation unit 11 and the sampling rate $clk_2$ of the analog/digital converter 12 are compared with one another, in that according to $$R_{2,1} = \frac{clk_2}{clk_1}$$

the ratio $R_{2,1}$ of the clock rate $clk_1$ to the sampling rate $clk_2$ is determined. Here, the ratio $R_{2,1}$ can be determined, for example, on the basis of at least one digital counter.

With the aid of the determined ratio $R_{2,1}$ the diagnosis unit 14 can according to $$k_1 = R_{2,1} * \frac{clk_{1,soll}}{clk_{soll}}$$

calculate a first compensation factor $k_1$. In this case, $clk_{1,2soll}$ is the known target values $clk_{1/2}$, of the clock rate $clk_1$ or of the sampling rate $clk_2$. The determined first compensation factor $k_1$ can be transmitted to the evaluation unit 13, so that it can compensate the distance value d' determined by FFT according to $$d = k_1 * d'$$

in order to determine therefrom the compensated fill-level value L. According to the invention, the clock rate $clk_1$ and the sampling rate $clk_2$ are compared relative to each other for the compensation. As a result, any deviations of the rates $clk_1$, $clk_2$ from their target values $clk_{1, 2,soll}$ are at least partially compensated, so that measurement errors caused thereby are minimized.

An advantage of the compensation according to the invention is that no external, highly accurate reference source has to be used for this purpose. Accordingly, it is possible for the fill-level measurement device 1 to carry out a corresponding compensation independently after its manufacture. A corresponding compensation can, for example, be carried out repeatedly at regular intervals during measurement operation. The repeated re-determination of the first compensation factor $k_1$ during or between continuous fill-level measurements can be used, for example, for checking the operability of the fill-level measurement device 1. The fill-level measurement device 1 can thus be defined as inoperable as soon as over the continuous fill-level measurements the first compensation factor $k_1$ exceeds a defined minimum change $\Delta k_1$ in relation to the value of the first compensation factor $k_1$ which was determined at or before the start of measurement operation.

Furthermore, a cyclically recurring re-determination of the first compensation factor $k_1$ can enable a traceability of the measured fill-level value L, for example according to the EN ISO 9001:2015 series of standards, provided a factory adjustment takes place in addition to the first compensation factor $k_1$. This can be performed by comparing the clock rate $clk_1$ and/or the sampling rate $clk_2$ in each case with a highly precise reference frequency $clk_{ref}$ of an external reference source. In this case, according to $$R_{1,ref} = \frac{clk_1}{clk_{ref}}; R_{2,ref} = \frac{clk_2}{clk_{ref}}$$

ratios $R_{1,ref}$, $R_{2,ref}$ of the rates $clk_1$, $clk_2$ to the reference frequency ($clk_{ref}$) can again be determined. On their basis, according to $$k_2 = \left(\frac{clk_{1,soll}}{R_{1,ref} * clk_{ref}}\right)^2 \cdot \frac{R_{2,ref} * clk_{ref}}{clk_{2,soll}}$$

a second compensation factor $k_2$ can be calculated. In principle, it is irrelevant here whether the second compensation factor $k_2$ is calculated internally by the diagnosis unit 14 or externally. In the case of internal calculation, the reference frequency $clk_{ref}$ of the diagnosis unit 14 can be impressed, for example, via a production interface 18. In the other case, the clock rate $clk_1$ and the sampling rate $clk_2$ can be transmitted to the outside via the production interface 18, so that during production the second compensation factor $k_2$ is determined externally at a corresponding compensation station and is then transmitted via the production interface 18 to the evaluation unit 13. In this way, as the measuring operation of the fill-level measurement device 1 progresses, the traceability of the compensated distance d can be ensured by continuously comparing the first compensation factor $k_1$ with the second compensation factor $k_2$.

Alternatively or additionally, the evaluation unit 13 of the fill-level measurement device 1 can compensate the determined distance value d' ex factory according to $$d = k_2 * d'$$

As a result of this additional compensation ex factory, measurement errors in fill-level measurement are further reduced. In this connection, it is also conceivable that the first compensation factor $k_1$, at least for the first time during the course of manufacture, is not calculated by the diagnosis unit 14 but likewise by the external compensation station.

The invention claimed is:

1. A frequency modulated continuous wave (FMCW)-based, fill-level measurement device for measuring a compensated fill level value of a filling material in a container, comprising:

a transmission unit via which a high-frequency signal can be transmitted in a direction of the filling material and, after reflection at the filling material surface, can be received as a received signal;

a signal generation unit designed to generate the high-frequency signal according to an FMCW principle and with reference to a defined clock rate;

a receiving unit designed to:
 downmix the received signal into a low-frequency base signal in accordance with the FMCW principle; and
 sample the base signal at a defined sampling rate;

an evaluation unit designed to:
 determine a distance value from the filling material by using the sampled base signal;
 compensate the distance value using a first compensation factor and/or a second compensation factor;, and
 determine the compensated fill-level value with the aid of the compensated distance value; and a diagnosis unit designed to:
 determine the first compensation factor by comparing the clock rate with the sampling rate;
 determine the second compensation factor by comparing the clock rate and/or the sampling rate with a reference frequency and/or the first compensation factor; and
 transmit the first compensation factor or the second compensation factor to the evaluation unit.

2. The fill-level measurement device according to claim 1, further comprising:
a production interface,
wherein for transmitting the first compensation factor, the second compensation factor, the clock rate, the sampling rate, and/or an external reference frequency, the fill-level measurement device can be connected via the production interface.

3. The fill-level measurement device according to claim 1, wherein the signal generation unit is realized as a phase-locked loop.

4. The fill-level measurement device according to claim 1, wherein the evaluation unit is designed to determine the distance value via a Fourier transform of the sampled base signal.

5. A method for compensating a fill-level measurement device, the method comprising:
providing the fill-level measurement device, including:
 a transmission unit via which a high-frequency signal can be transmitted in a direction of a filling material and, after reflection at the filling material surface, can be received as a received signal;
 a signal generation unit designed to generate the high-frequency signal according to an FMCW principle and with reference to a defined clock rate;
 a receiving unit designed to:
  downmix the received signal into a low-frequency base signal in accordance with the FMCW principle; and
  sample the base signal at a defined sampling rate;
 an evaluation unit designed to:
  determine a distance value from the filling material by using the sampled base signal;
  compensate the distance value using a first compensation factor and/or a second compensation factor; and
  determine the compensated fill-level value with the aid of the compensated distance value; and
 a diagnosis unit designed to:
  determine the first compensation factor by comparing the clock rate with the sampling rate;
  determine the second compensation factor by comparing the clock rate and/or the sampling rate with a reference frequency and/or the first compensation factor; and
  transmit the first compensation factor or the second compensation factor to the evaluation unit;
determining the first compensation factor by comparing the clock rate with the sampling rate, and/or
determining the second compensation factor by comparing the clock rate and/or the sampling rate with the reference frequency.

6. The method according to claim 5, wherein the clock rate ($clk_1$) and the sampling rate ($clk_2$) are compared with one another according to:

$$R_{2,1} = \frac{clk_2}{clk_1}$$

wherein the first compensation factor ($k_1$) is calculated according to:

$$k_1 = R_{2,1} * \frac{clk_{1,soll}}{clk_{2,soll}}$$

and wherein $clk_{1,soll}$ is the target value of the clock rate ($clk_1$) and $clk_{2,soll}$ is the target value of the sampling rate ($clk_2$).

7. The method according to claim 6, wherein the clock rate ($clk_1$) and the sampling rate ($clk_2$) are each compared with the reference frequency ($clk_{ref}$) according to:

$$R_{1,ref} = \frac{clk_1}{clk_{ref}}; R_{2,ref} = \frac{clk_2}{clk_{ref}}$$

and wherein the second compensation factor ($k_2$) is calculated according to:

$$k_2 = \left(\frac{clk_{1,soll}}{R_{1,ref} * clk_{ref}}\right)^2 \cdot \frac{R_{2,ref} * clk_{ref}}{clk_{2,soll}}.$$

8. The method according to claim 6, wherein the first compensation factor is repeatedly determined during continuous fill-level measurements, and wherein the fill-level measurement device is classified as functional as long as the first compensation factor over the continuous fill-level measurements does not exceed a minimum change.

9. The method according to claim 7, wherein the second compensation factor is determined during the manufacture of the fill-level measurement device by comparing the clock rate and/or the sampling rate with the reference frequency of an external reference source.

10. The method according to claim 9, wherein the second compensation factor is calculated by an external unit, and wherein the second compensation factor is transmitted via the production interface to the evaluation unit.

11. The method according to claim 9, wherein the reference frequency is transmitted via the production interface to the analysis unit, and wherein the second compensation factor is calculated by the analysis unit.

* * * * *